United States Patent [19]
Trica

[11] Patent Number: 5,856,739
[45] Date of Patent: Jan. 5, 1999

[54] WIDE INPUT RANGE STEP-DOWN DC TO DC CONVERTER

[75] Inventor: Alexander Trica, North York, Canada

[73] Assignee: Spartec International Corp., Mississauga, Canada

[21] Appl. No.: 904,235

[22] Filed: Jul. 31, 1997

[51] Int. Cl.⁶ .............................. G05F 1/10; H02M 3/335
[52] U.S. Cl. ............................................ 323/222; 363/21
[58] Field of Search .................................. 323/220, 222, 323/901; 363/20, 21, 49, 97, 131

[56] References Cited

U.S. PATENT DOCUMENTS

| | | | |
|---|---|---|---|
| 4,530,043 | 7/1985 | Palm et al. | 363/21 |
| 5,418,709 | 5/1995 | Lukemire | 323/222 |
| 5,565,761 | 10/1996 | Hwang | 323/222 |
| 5,659,241 | 8/1997 | Horiuchi et al. | 323/222 |

Primary Examiner—Matthew V. Nguyen
Attorney, Agent, or Firm—Harris Beach & Wilcox, LLP.

[57] ABSTRACT

A DC to DC converter power supply for converting a varying unregulated DC voltage into a lower voltage regulated output. The DC to DC converter has a buck topology and includes a high frequency switch with a variable duty cycle, a regulating filter, a current inner control loop, a voltage outer control loop, a latching switch that provides a load bypass during startup, a logic circuit oscillator that controls the high frequency switch frequency duty cycle as a function of both the inner control loop current and the outer control loop voltage, and a circuit that taps the source voltage for a power input to the logic circuit oscillator during startup. The DC to DC converter admits a source voltage range of approximately 4:1 and provides a regulated fixed output voltage that ranges from approximately 30% of the source voltage at the lowest accommodated source voltage to approximately 5% of the source voltage at the highest accommodated source voltage.

20 Claims, 2 Drawing Sheets

WIDE INPUT RANGE STEP-DOWN DC TO DC CONVERTER

BACKGROUND OF THE INVENTION

The present invention relates to a DC to DC converter that admits power from a wide range of fluctuating industrial level voltages and automatically converts those voltages to a regulated DC voltage that is well below the voltage range of the admitted power.

There is a wide range of industrially available utility supplied line voltages to power electrical equipment, ranging from 208 to 600 VAC, and alternatively 270 to 830 VDC. This powered equipment, while containing some modules that require voltage levels within that input range, also contain modules that require a regulated 48 VDC voltage. Additionally, it may be preferred that electrical equipment modules requiring a voltage of less than 48 VDC, be connected to a regulated 48 VDC output voltage as the source voltage for further conversion.

Conventionally, a DC to DC converter is used to convert alternatively a high valued DC voltage to a lower valued DC voltage, or a low valued DC voltage to a higher valued DC voltage. In order to convert a high valued AC voltage to a differently valued DC voltage, a rectification circuit is imposed between an AC line and a DC to DC converter, so that the AC voltage is first converted to a full wave rectified voltage, and subsequently input to the DC to DC converter, to be output as a lowered or raised DC voltage.

Conventional voltage lowering DC to DC converters operate over a 2:1 input range. Beyond that 2:1 range, they are alternatively unstable or are not able to maintain a regulated output, because of the requirement for extremely rapid witching caused by the combination of a high frequency chopping rate and a low duty cycle.

OBJECTS AND SUMMARY OF THE INVENTION

It is accordingly an object of the present invention to provide a DC to DC converter that operates automatically over a variable input range of 4:1, and alternatively produce a near constant voltage.

Another object of the present invention to provide a DC to DC converter that operates automatically over a variable input range that is at least four times as great as the near constant output voltage.

It is still a further object of the present invention to provide a DC to DC converter that operates automatically over a fluctuating input range of at least 230 VDC to 940 VDC, outputs a near constant 48 VDC, and produces at least 100 W of power.

Briefly stated, a DC to DC converter for converting an unregulated DC source that may vary over a range from 230 VC to 940 VDC voltage is converted into a regulated 48 VDC output at a regulated current of approximately 2 amperes. The DC to DC converter has a buck topology and includes a high frequency switch with a variable duty cycle, a regulating filter, a current inner control loop, a voltage outer control loop, a latching switch that provides a load bypass during startup, a logic circuit oscillator that controls the high frequency switch frequency duty cycle as a function of both the inner control loop current and the outer control loop voltage, and a circuit that taps the source voltage for a power input to the logic circuit oscillator during startup. The DC to DC converter thus admits a source voltage range of approximately 4:1 and provides a regulated fixed output that ranges from approximately 30% of the source voltage at the lowest accommodated source voltage to approximately 5% of the source voltage at the highest accommodated source voltage.

According to an embodiment of this invention, a DC to DC converter includes a high frequency switch for defining a chopped output train of voltage pulses, an oscillator circuit that includes a switch driver for controlling the opening and closing of the high frequency switch, a regulation circuit that includes an inductor, for regulating the voltage pulse train, and output current and output voltage control signals for varying the duty cycle of the pulse train. The DC to DC converter of the invention additionally includes a switch for limiting the output voltage during the startup of the DC to DC converter, and a means to supply voltage to the internal circuitry of the DC to DC converter from the input voltage until the high frequency switch has begun to operate.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
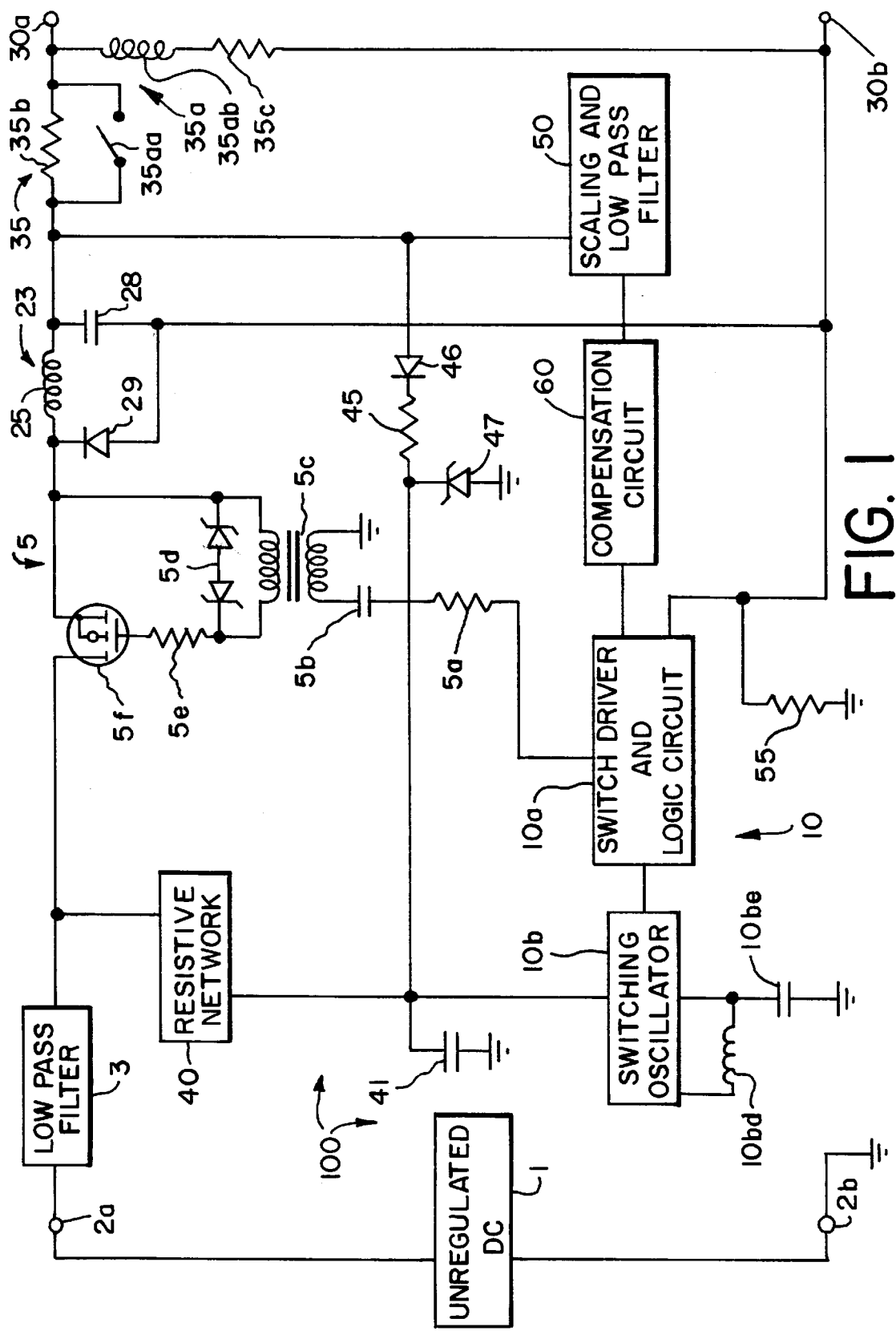
FIG. 1 portrays a functional schematic of the DC to DC converter.

Referring to FIG. 1, an unregulated DC voltage source 1 supplies input voltage to the DC to DC converter 100 of this invention. The DC to DC converter is a buck converter with a current inner control loop and a voltage outer control loop. The inner current control loop comprises the current output of an inductor 25 and a diode 29 of a filtering circuit 23, a resistor shunt 55, a switch driver and logic circuit 10a of a switching regulator 10, and a high frequency switch 5. The outer voltage control loop comprises a capacitor 28 of the filtering circuit 23, a load electrically connected between output terminals 30a and 30b, a scaling resistor network and low pass filter 50, a compensation circuit 60, the switch driver and logic circuit 10a of the switching regulator 10, and the high frequency switch 5.

The voltage source 1 is unregulated, meaning that it may be not essentially constant. The voltage source connects to the DC to DC converter 100 across positive terminal 2a and ground terminal 2b. In fact, it may even be a DC voltage formed as a full wave rectified AC voltage. To filter out the peak values of an unregulated DC input, the DC to DC converter includes a low pass filter 3.

The high frequency switch 5 switches on and off at a high frequency, accordingly converting the filtered input voltage into a chopped output train of voltage pulses, whose magnitude is identical to the source voltage. The resulting chopped waveform has a frequency defined by the switching rate, and a duty cycle defined by the percentage of time switch 5 is in the closed position versus the time between consecutive switch 5 closures. The switch 5 of the invention has a frequency above the audio spectrum (16 kHz), and a duty cycle as low as 5%. Thus, the switch 5 must transition between a closed position and an open position, within $3.1 \times 10^{-6}$ seconds, comparable to at least a 320 kHz frequency.

Switch 5 is driven by a driver circuit 10a, and comprises a current limiting resistor 5a, a decoupling capacitor 5b, a transformer 5c, a Zener diode pair 5d, a gate resistor 5e, and a high speed solid state switching device, preferably the MOSFET switch 5f. To accomplish the very high switch rate mandated by a duty cycle of 5% and a switch frequency above the audio spectrum, the transformer 5c shield must be designed to minimize leakage inductance and parasitic capacitance, the gate resistor 5e must have a substantially low value compatible with adequate voltage spike suppression, and the Zener diode pair 5d must be sized to minimize the MOSFET 5f switch rate. The driver circuit 10a, and the manner in which both the frequency and the duty cycle of the switch 5 is determined is disclosed presently with regard to the switching regulator 10.

A filtering circuit 23 is electrically connected between the output of switch 5 and positive output terminal 30a. The filtering circuit 23 includes an inductor 25 electrically connected between the output of switch 5 and the terminal 30a, so that the magnetic field of inductor 25 opposes the abrupt current changes of the switch 5 output. A free wheeling diode 29 is electrically connected between the output side of the switch 5 and the ground output terminal 30b, conducting current in the direction of the input side of inductor 25 only. The inductor 25 and the diode 29 ensure that when switch 5 is switched-off, there is a current flow through a load connected between output terminals 30a and 30b. The filtering circuit 23 additionally includes a capacitor 28 electrically connected between the converter 100 output side of inductor 25 and the ground output terminal 30b of converter 100. The capacitor 28 accumulates charge when current flow through the inductor 25 exceeds the load current, and discharges when current flow through the inductor 25 is less than the load current, thus filtering the output voltage of the converter 100. Together, the inductor 25, the free wheeling diode 29, and the capacitor 28 filter the current and voltage output of switch 5 and accordingly provide a regulated converter voltage and current output.

A pre-charge circuit 35 is connected between the filtering circuit 23 and the positive output terminal 30a. The pre-charge circuit 35 comprises a switch 35a and a resistor 35b connected in parallel. At startup, when there is a relatively significant voltage change delivered to the output of the converter 100 having a high capacitive load, the switch 35a opens, and the resistor 35b attenuates the output, limiting the output to a relatively low value. Thus, the capacitive load slowly charges at startup. During steady state when the converter 100 output is changing relatively negligibly, and the voltage output is within its designed range, the switch 35a closes and short circuits the resistor 35b, stopping the attenuation of the output. The preferred implementation of the switch 35a is a relay that latches in alternatively the open or the closed position. The relay 35a comprises a contact 35aa and a coil 35ab. The coil 35ab is electrically connected across the converter output 30a and 30b in series with a resistor 35c. Thus, the resistor 35b limits the charging current of the output until the output reaches a value determined by resistor 35c and switch 35a closes, consequently short circuiting resistor 35b.

The switching regulator 10 of the invention comprises the switch driver and logic circuit 10a, and a switching oscillator 10b. The preferred embodiment of a switching regulator is a model LT1105 Offline Switching Regulator distributed by the Linear Technology Corporation of Milpitas, Calif. The switching oscillator 10b sets the switching frequency and the base duty cycle of the switch 5. The LT1105 logic circuit allows the modification of the duty cycle from its base value, thus enabling a pulse width modulated (PWM) switch control. The switch regulator 10 of the invention therefore provides a PWM switch 5 output. The pulse duty cycle is altered as a result of converter 100 output feedback in a manner to be disclosed presently. Now, the implementation of the oscillator 10b frequency and base duty cycle determination is disclosed.

Figure 2:
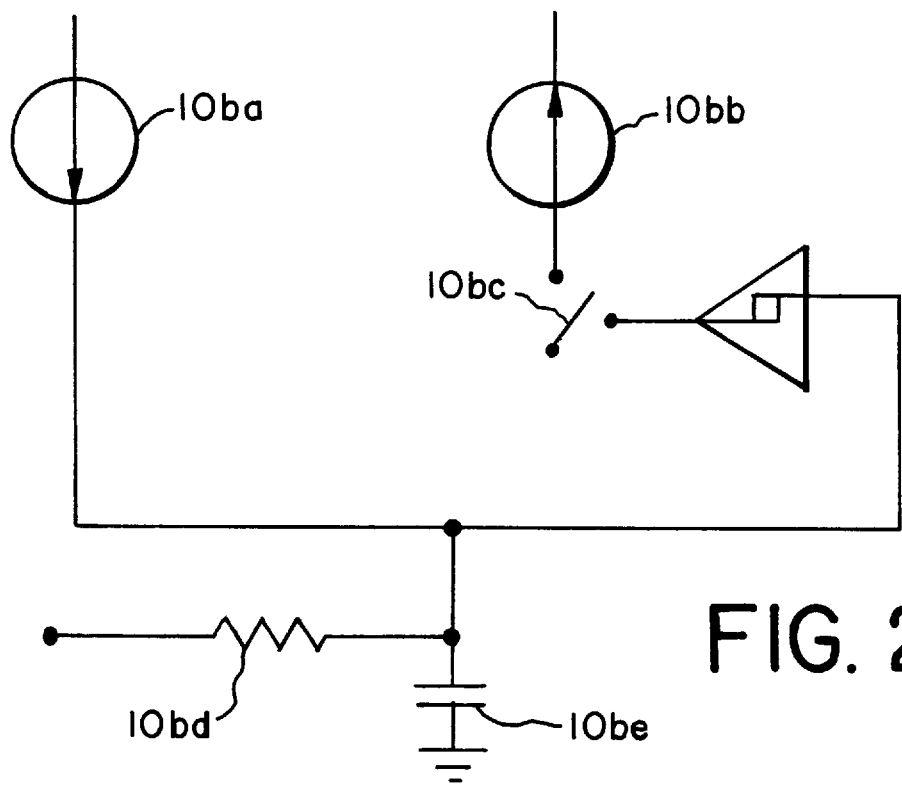
FIG. 2 portrays a schematic of the switching oscillator with attached frequency and duty cycle setting circuitry.

Referring to FIG. 2, current $I_1$ of 150 $\mu$A is driven through source 10ba toward capacitor 10be. Current $I_2$ of 450 $\mu$A is driven through source 10bb from switch 10bc. Capacitor 10be and resistor 10bd are not part of the switching regulator 10, but are electrically connected to the switching regulator for setting the switching frequency and base duty cycle. Switch 10 bc is off when voltage across capacitor 10be is below 4.5V and then goes on until the voltage across capacitor 10be drops below 2V. In normal operation, the capacitor 10be is loaded by current $I_1$ until the voltage across capacitor 10be reaches 4.5 V. When the voltage across capacitor 10be has reached 4.5V, switch 10be goes on and capacitor 10be discharges with a constant current $(I_2-I_1)$ of 300 $\mu$A. The relationship between the voltage, the capacitor, and the duty cycle is derived according to the following equations:

$$\text{Time On} = \frac{\Delta V * C}{I_1} \quad (1)$$

$$\text{Time Off} = \frac{\Delta V * C}{I_2 - I_1} \quad (2)$$

where $\Delta V = 4.5V - 2V$

C is the capacitance of capacitor 10be.
The period T of the pulses is then:

$$T = \text{Time On} + \text{Time Off} = \Delta V C * \left( \frac{1}{I_1} + \frac{1}{I_2 - I_1} \right) \quad (3)$$

The base duty cycle is $$\frac{\text{Time On}}{T} = \frac{I_2 - I_1}{I_2} = 66\%$$

In order to achieve a maximum base duty cycle less than 66%, a resistor 10bd is electrically connected between capacitor 10be and the switching regulator 10 reference voltage source, $V_{ref}$. If $V_{ref}$ is greater than 4.5V, the current flowing through resistor 10bd will help charge the capacitor 10be and steal part of the discharging current. The Linear Technology Corporation LT1105 $V_{ref}$ is 15V. Thus, it helps charge the capacitor 10be and draw part of the current from the capacitor 10be during discharge. If $V_{ref}$ were not greater than 4.5V, another voltage source would be used as a source connection for resistor 10bd. Solving the differential equation governing the circuit, $$\text{Time On} = R * C * \ln\left( \frac{V_{REF} + I_1 * R - V_1}{V_{REF} + I_1 * R - V_2} \right) \quad (4)$$

$$\text{Time Off} = R * C * \ln\left( \frac{V_{REF} - (I_2 - I_1) * R - V_2}{V_{REF} - (I_2 - I_1) * R - V_1} \right), \quad (5)$$

for there to be an oscillation condition, $V_{ref}$ is to be greater than 4.5V and $$R > \frac{V_{REF} - V_1}{I_2 - I_1} \quad (6)$$

where R is the resistance of resistor 10*bd*.

$$T = \text{Time On} + \text{Time Off} \quad (7)$$

$$= R * C * \ln\left(\frac{V_{ref} + I_1 * R - V_1 * V_{ref} - (I_2 - I_1) * R - V_2}{V_{ref} + I_1 * R - V_2 * V_{ref} - (I_2 - I_1) * R - V_1}\right)$$

and the maximum duty cycle $\Delta_{max}$ is defined by the following equation:

$$\Delta_{max} = \frac{\text{Time On}}{T} = \frac{1}{1 + \frac{\ln\left(\frac{V_{ref} - (I_2 - I_1)*R - V_2}{V_{ref} - (I_2 - I_1)*R - V_1}\right)}{\ln\left(\frac{V_{ref} + I_1 * R - V_1}{V_{ref} + I_1 * R - V_2}\right)}} \quad (8)$$

The duty cycle is a function of $V_{ref}$ and resistor 10*bd* and is independent of capacitor 10*be*.

The preferred embodiment of this invention is a DC to DC converter that accommodates an input voltage range of 230 VDC to 940 VDC, and supplies a regulated 48 VDC output. Conventional simulations of the DC to DC converter 100 of the invention indicate that a duty cycle of no greater than 20% will accommodate an input voltage of as little as 230 VDC. Thus, to provide a margin of error, a base maximum duty cycle of 25% is selected. A base maximum duty cycle of 25% at a $V_{ref}$ of 15V, recommends a resistor 10*bd* of approximately 63 kΩ. The preferred embodiment uses a standard 1% tolerance resistor of 63.4 kΩ that yields a base maximum duty cycle of 25.3%. A high switching frequency, such as 20 kHz, is preferable so that the inductor 25 and capacitor 28 of filtering circuit 23 be moderately valued, yielding a more stable circuit. At a 20 kHz switching frequency, the capacitor 10*bc capacitance is approximately* 1.696 nF. The preferred embodiment uses a standard 1.8 nF capacitor yielding a switching frequency of 18.84 kHz The converter 100 of the invention supplies voltage to the switching regulator 10 to drive the high frequency switch 5, before the converter 100 reaches steady state and is able to supply a buck conditioned chopped voltage to the switching regulator 10. A resistance network 40 is electrically connected at one end between the low pass filter 3 and the switch 5, and at the other end to the switching regulator 10 input voltage terminal. The voltage is produced from the high voltage source through the resistance network 40, which preferably charges a capacitor 41 in common with the regulator 10 input voltage terminal. The capacitor 41 and the resistor network 40 together provide the current necessary to supply the switching regulator 10 with startup voltage, with the capacitor also serving to regulate the current input. The resistance network 40 resistance values are calculated from the minimum source voltage that the DC to DC converter 100 accommodates, divided by the current that the switching regulator 100 requires. The preferred embodiment Linear Technology Corporation LT1105 switching regulator 10 requires approximately 500 μA of current. Thus, at an assumed minimum source voltage of 250 V, the resistance value of the resistor network is 500 kΩ. The maximum required power dissipation rating of any resistor of the resistance network is calculated by deriving the maximum current through that resistor at the maximum voltage across the resistor, and accordingly deriving the power dissipation of the resistor as a function of the just derived resistance value. Thus, for a single resistor and a maximum DC to DC converter source voltage of 900 volt, the maximum current is 1.8 mA (900V/500 kΩ), and the power dissipation is 1.62W ($900V^2$/500 kΩ).

At steady state, when the high frequency switch 5 is already supplied with voltage, and the converter 100 has begun to run, a resistor network comprising a resistor 45 that is electrically connected between a point between the regulating inductor 25 and the positive output terminal 30*a*, and the switching regulator 10 input voltage terminal supplies voltage to the switching regulator 10 input voltage terminal. The resistor 45 is sized to step the voltage down from the output level of the converter 100 to the switching regulator 10 input voltage terminal. The tap 45 includes a series diode 46 to prevent the resistance network 40 current from flowing into resistor 45.

In common with the switching regulator 10 input voltage terminal is preferably a Zener diode 47 that provides regulation to the switching regulator 10 input voltage. Additionally, the capacitor 41 in common with the switching regulator 10 input voltage terminal provides regulation to the current from resistor 45.

The converter 100 of the invention utilizes both an outer control loop output voltage feedback signal and an inner control loop output current feedback signal to vary the switch 5 duty cycle to a level determined by the control current and voltage, and accordingly maintain a selected output voltage, preferably 48 VDC. The LT1105 provides both a voltage input for a current feedback signal whose current is proportional to the voltage input, and an input for a voltage feedback signal. The LT1105 compares each signal to its own internal reference value, and derives a current feedback error signal and a voltage feedback error signal, and responds to the error signal. The voltage feedback signal is conditioned by a low pass filter and a scaling resistor network 50. The scaling resistor network 50 scales the output voltage so that the preferred 48 VDC output is equal to the voltage feedback LT1105 internal reference. The current feedback signal is in common with a resistor 55 shunted to ground, so that the current feedback is proportional to a scaled current. The DC to DC converter 100 of the invention thus automatically maintains a constant voltage output over a range of load and over a wide range of source voltage.

The DC to DC converter 100 of the invention further includes a compensation circuit 60 to adjust the poles and zeroes of the transfer function of an equivalent network of the converter 100, so that the converter 100, with a compensation circuit 60 adjusted duty cycle is stable over its operating range. The LT1105 includes inputs for the compensation circuit 60 that place the compensation circuit 60 in a series relationship with the outer loop voltage feedback signal. While each of the individual components of the switching regulator 10, the filtering circuit 23, the low pass filter and scaling resistor network 50, the shunt resistor 55, and an equivalent resistance value for each of the capacitors and inductors of the circuit are individually selected for accomplishment of their specific individual functions, their relative values as well as the range of expected load impedance is important for a stable DC to DC converter 100.

Figure 3:
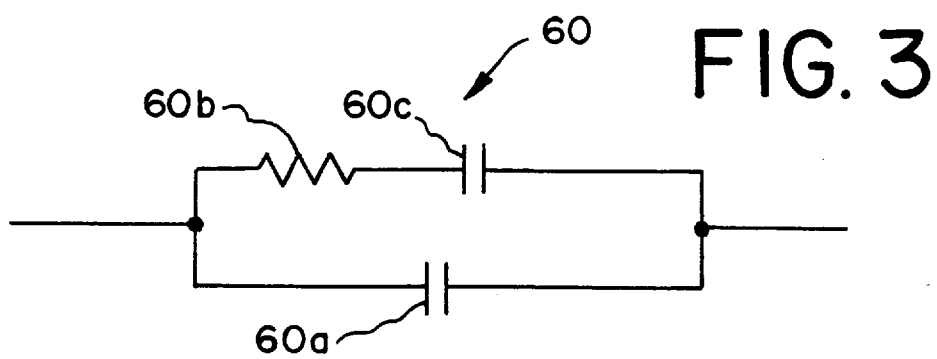
FIG. 3 portrays a schematic of the compensation circuit.

An equivalent circuit of the converter 100 across a load is derived, and a corresponding transfer function is developed. The drive circuitry of the switch driver and logic circuit 10*a*, the switch 5, and the source voltage 1, can be preferably equated with a pure amplifier that has a gain determined from both the input voltage and the maximum voltage of the control circuits' error amplifier. For the LT1105, that voltage is 4.13V. Furthermore, the error amplifier can be characterized with a specific transconductance. For the LT1105, that transconductance is 1200 μmhos. Accordingly, Referring to FIG. 3, the compensation circuit 60 comprises a capacitor 60*a* in parallel with a series resistor 60*b* and capacitor 60*c*. The circuit was contemplated during the conceptualization of the invention. Stability analyses performed during reduction to practice has shown this circuit provides for a stable converter for selected resistor and capacitor values. The transfer function of the error amplifier is $$H_{EA}(s) = \frac{V_{out}(s)}{V_{IN}(s)} = G_m * Z(s) \quad (10)$$

where $G_m$ is the transconductance of the error amplifier.
The transfer function of the compensation circuit is $$H_{CC}(s) = \frac{G_M * (s + (1/C_1 * R_1))}{C_2 * s * (s + (1/R_1 * C_1 * C_2/(C_1 + C_2)))} \quad (11)$$

where $R_1$ is the resistance of resistor 60b
$C_1$ is the capacitance of capacitor 60a, and
$C_2$ is the capacitance of capacitor 60c.

A stability analysis of the circuit is performed. The stability analysis may be alternatively a state space analysis or a frequency domain analysis based on gain and phase margin. Because the converter 100 is a single input, single output system, a frequency analysis is preferred. From the result of the stability analysis, a design of the compensation circuit 60 may be selected, and the values of the other components of the converter 100 may be altered. The stability analysis indicates that the output load over which the converter 100 is stable over an input range of from 230 VDC to 940 VDC, with an output current somewhat greater than 2A, and a an output voltage of 48 VDC+2%, −1%. The range of duty cycle is 8.6%–19.23%.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A DC to DC converter for generating a regulated DC output voltage from an unregulated DC input voltage comprising:

input means for connecting to a source of unregulated DC voltage;

output means for connecting to a DC load;

first switch means for switching said unregulated DC voltage defining an output pulse train;

filtering means for smoothing the output of the first switch means, defining a smoothed output;

an oscillator and drive circuit means for controlling the switching activity of said first switch means;

feedback means, responsive to a voltage feedback signal that varies in accordance with the voltage across said load and to a current feedback signal that varies in accordance with the current through said output for controlling the operation of said oscillator and drive circuit means and thereby regulating the voltage at said output;

second switch means for switching said smoothed output, connected to said filtering means and to said output, said second switch means having a first, starting state in which current through said output is limited to a relatively low value and a second, running state in which current through said output is not limited to said relatively low value; and first means connected to said input means for supplying operating power to said oscillator and drive circuit means when said second switch is in its starting state, and second means connected to said output for supplying operating power to said oscillator and drive circuit means when said second switch means is in its running state.

2. The converter of claim 1 in which said second switch means has a latching characteristic.

3. The converter of claim 2 in which said second switch means comprises switching element and an actuating element, and in which said actuating element is connected across said output means.

4. The converter of claim 3 in which said switching element comprises a contact of a relay, and in which said actuating element comprises a coil of said relay.

5. The converter of claim 1 in which said oscillator and drive circuit means comprises a power input, in which said first means comprises a first current conducting device connected between the input of the converter and the power input of said oscillator and drive circuit means, and in which said second means comprises a second current conducting device connected between said second switch means and said power input.

6. The converter of claim 1 in which said filtering means further comprises an inductor in series with said first switch means and said second switch means, said inductor input comprising said pulse train, whereby said inductor output is a regulated output.

7. The converter of claim 6, in which said filtering means further comprises a capacitor and a diode connected across said inductor.

8. The converter of claim 1 in which said oscillator and drive circuit means applies to said first switch means a periodic switching control signal having a duty cycle that varies in accordance with said voltage and current feedback signals.

9. The converter of claim 7 in which said switching control signal has a frequency that is greater than 16 kHz.

10. The converter of claim 7 in which said switching control signal has a duty cycle in which the on state of said first switch means occupies from about 5% to about 25% of the switching period of said first switch means.

11. The converter of claim 7 in which said switching control signal has a duty cycle in which the on state of said first switch occupies less than 10% of the switching period of said first switch.

12. A switching regulator generating a regulated output voltage from an unregulated input voltage comprising:

power input means for connecting to a source of unregulated DC voltage;

power output means for connecting to a DC load;

filtering means for smoothing the output of a switching means for switchably connecting said regulating means between said power input and said power output, whereby said filtering means forms a smoothed output;

said switching means;

oscillator means for applying a periodic switching control signal to said switching means;

feedback means for controlling said oscillator means in accordance with at least one of the voltage and current at said power output, and thereby regulating the voltage at said power output;

a starting control circuit coupled between said power input means and said power output means, said starting control circuit having a first state in which said regulator is able to start at a relatively low output current and a second state in which said regulator is able to run at a relatively high output current value; and switchover control means, coupled to said power input, said power output and said oscillator means, for supplying operating power to said oscillator in spite of changes in the state of said starting control circuit.

13. The regulator of claim 12 in wherein said filtering regulation means comprises an inductor in series with said switching means and said power output means.

14. The regulator of claim 12 in which said feedback means applies to said switching means a periodic control signal having a duty cycle that varies in accordance with at least one of said voltage and current.

15. The regulator of claim 14 in which said feedback means has a frequency that is greater than 16 kHz.

16. The regulator of claim 14 in which said feedback means has a duty cycle in which the on state of said switching means occupies from about 5% to about 25% of the switching period of said switching means.

17. The regulator of claim 14 in which said feedback means has a duty cycle of which the on state of said switching means occupies less than 10% of the switching period of said switching means.

18. The regulator of claim 12 in which said source voltage varies over a range of at least three to one.

19. The regulator of claim 12 in which said regulated output voltage varies over a range of voltages at least three times greater than said source voltage.

20. The converter of claim 1 wherein said first switch means and said filtering means are connected in series between said input and said output.

* * * * *